United States Patent
Haumont et al.

(10) Patent No.: US 7,149,501 B2
(45) Date of Patent: Dec. 12, 2006

(54) VOICE MAIL SERVER, MOBILE STATION AND METHOD FOR VOICE MAIL MESSAGE TRANSMISSION

(75) Inventors: Serge Haumont, Helsinki (FI); Mikko Kanerva, Helsinki (FI); Hannu Kari, Veikkola (FI)

(73) Assignee: Nokia Corporation, Espoo (FI)

( * ) Notice: Subject to any disclaimer, the term of this patent is extended or adjusted under 35 U.S.C. 154(b) by 671 days.

(21) Appl. No.: 09/751,036

(22) Filed: Dec. 28, 2000

(65) Prior Publication Data
US 2001/0019951 A1   Sep. 6, 2001

Related U.S. Application Data

(63) Continuation of application No. PCT/EP98/04339, filed on Jul. 6, 1998.

(51) Int. Cl.
 *H04M 11/10* (2006.01)
(52) U.S. Cl. ............... 455/413; 455/412.1; 455/412.2; 379/67.1; 379/88.12; 379/88.22
(58) Field of Classification Search ............ 455/412.1, 455/412.2, 413, 414.4, 466; 379/85–87, 379/88.11–88.15, 88.22, 88.23, 88.25, 88.18, 379/67.1
See application file for complete search history.

(56) References Cited

U.S. PATENT DOCUMENTS

| | | | |
|---|---|---|---|
| 4,468,813 A | * | 8/1984 | Burke et al. ............. 340/7.57 |
| 5,455,579 A | * | 10/1995 | Bennett et al. ............. 341/110 |
| 5,768,509 A | * | 6/1998 | Gunluk ................ 709/203 |
| 5,802,466 A | * | 9/1998 | Gallant et al. ............. 455/413 |
| 5,884,160 A | * | 3/1999 | Kanazaki ................ 455/413 |
| 5,889,839 A | * | 3/1999 | Beyda et al. ............. 379/88.12 |

(Continued)

FOREIGN PATENT DOCUMENTS

EP          0 739 147          10/1996

(Continued)

*Primary Examiner*—William Trost
*Assistant Examiner*—James D. Ewart
(74) *Attorney, Agent, or Firm*—Squire, Sanders & Dempsey LLP

(57) ABSTRACT

Within a cellular network, an incoming voice mail message is received at a voice mail server (20), adapted into a format suitable for transmission by a network connection which does not meet a delay requirement for delay sensitive information, dispatched to a mobile station (30), and received, readapted and stored thereat within a storing means (35). Adaptation, transmission, reception and readaptation conform to standards such as the GPRS and the UMTS. The voice mail message is dispatched directly to the mobile station (30) via an IP address of an ISDN address thereof. In this manner, instead of dispatching a message via the SMS, the sending of an adapted voice mail message directly to a mobile station (30) and storing it thereat makes it possible to avoid that a user has to poll a service center by calling in order to have the message delivered.

11 Claims, 1 Drawing Sheet

U.S. PATENT DOCUMENTS

| | | | | |
|---|---|---|---|---|
| 6,006,087 A * | 12/1999 | Amin | ................... | 455/413 |
| 6,061,572 A * | 5/2000 | Laiho | ................... | 455/466 |
| 6,081,707 A * | 6/2000 | Christensen et al. | ................... | 455/413 |
| 6,091,947 A * | 7/2000 | Sumner | ................... | 455/413 |
| 6,094,587 A * | 7/2000 | Armanto et al. | ................... | 455/567 |
| 6,188,885 B1 * | 2/2001 | Kolev et al. | ................... | 455/413 |
| 6,259,925 B1 * | 7/2001 | Josse | ................... | 455/466 |
| 6,292,668 B1 * | 9/2001 | Alanara et al. | ................... | 455/466 |
| 6,304,573 B1 * | 10/2001 | Hicks, III | ................... | 370/401 |
| 6,333,973 B1 * | 12/2001 | Smith et al. | ................... | 379/88.12 |
| 6,704,394 B1 * | 3/2004 | Kambhatla et al. | ................... | 379/67.1 |
| 7,003,304 B1 * | 2/2006 | Helferich | ................... | 455/458 |
| 2001/0029176 A1 * | 10/2001 | Taniguchi | ................... | 455/413 |

FOREIGN PATENT DOCUMENTS

EP        0 758 175        2/1997

* cited by examiner

VOICE MAIL SERVER, MOBILE STATION AND METHOD FOR VOICE MAIL MESSAGE TRANSMISSION

This application is a continuation of international application Ser. No. PCT/EP98/04339, filed 6 Jul. 1998.

The present invention relates to transmission and reception of voice mail messages in a cellular network, and in particular concerns a voice mail server and a mobile station capable of handling segmented voice mail messages, and a method for carrying out the same.

BACKGROUND OF THE INVENTION

In recent years, the Global System for Mobile Communications (GSM) has grown rapidly all over the world. Along with the development of the GSM and the integration of mobile stations (MS) such as mobile phones and data communications, a plurality of additional services have been implemented.

Among theses services are data services such as the Short Message Service (SMS), which is a bi-directional service in the GSM for short alphanumeric messages, or a service providing access to the Internet using a mobile station.

In case of the SMS, it is possible to deliver a message to the mobile station even during an established call, or to deliver a message using a so-called store-and-forward service, in which the message is stored in the network, if the mobile station is unavailable, and forwarded shortly after the mobile station can be reached again. As for the Internet access, the user can connect to the Internet via the mobile station's IP address and transmit or receive segmented data via the cellular network resources.

In the traditional GSM, data services are based on circuit switched technology providing a maximum user rate of 9.6 Kbit/s for transparent and non-transparent bearer services for data communication. Along with an increasing data volume, demand for higher user rates has arisen, so that the GSM has been developed to include, as an extension, for example the General Packet Radio Service (GPRS) as a packet switched data service.

Packet switching in particular provides advantages over the traditional circuit switching technology in that it only exploits network resources and valuable bandwidth when data is actually being transmitted. Even short gaps between data transmissions leave the network available for other users. On this basis, the GPRS can provide for extremely efficient radio resource utilization with user rates of above 100 Kbit/s.

Even higher user data rates of up to 2 Mbit/s are expected to become available with the future Universal Mobile Telecommunications System (UMTS).

Messages deliverable within the aforementioned data services networks also include a range of mail type messages such electronic mail messages and voice mail messages.

FIG. 2 schematically shows the principle of delivering a voice mail message in the prior art using the traditional GSM.

In FIG. 2, reference numeral 1 denotes a conventional cellular network such as the GSM. Reference numeral 2 denotes a voice mail server within the GSM 1. The voice mail server 2 is provided with a storage means 3 for storing an incoming voice mail message. A dashed line indicates a GSM air connection for exchanging information with a mobile station 4 at the user side.

As shown in FIG. 2, an incoming voice mail message is in the traditional GSM first of all stored in the storage means 3 of the voice mail server 2. The voice mail server 2 then sends an SMS notification to the mobile station 4 so as to alert the user of the stored voice mail message. In order to listen to the message, the user is then required to call the voice mail server 2 from his mobile station 4, which in response then dispatches the stored message.

In the GPRS, the user can activate either the voice service or the packet data service, or can activate both of them simultaneously. However, a mobile station having a simple construction may due to restrictions for reasons of e.g. simplicity in the mobile station implementation and signaling not be capable of following both services simultaneously, so that in this case the user must terminate or suspend the packet data service in order to become able to call the voice mail server and to listen to an arrived voice mail message.

In any case, the user is thus required to observe whether or not a voice mail message is to be retrieved, and then call back the voice mail server to have the message delivered. Inherent to this are drawbacks such as the cost for establishing the connection to the voice mail server each time a voice mail message is indicated at the mobile station, and the operations the user must perform anew each time in order to access the message.

In addition, the voice mail transmission as such has shown to be largely delay insensitive. Up to now, low delay transmission methods are however used in vain when the user is required to listen to a voice mail message stored at the voice mail server in real time.

It is therefore an object of the present invention to provide a voice mail server for delivering a voice mail message, a mobile station for receiving a voice mail message, and a corresponding method therefor, which allow to automatically dispatch a voice mail message via a connection not necessarily meeting the quality required to transfer speech in real time and, thus, eliminate the need to poll a voice mail server by calling.

This object is achieved by a voice mail server for a cellular network, comprising a receiving means for receiving an incoming voice mail message, an adapting means for adapting the voice mail message into a format suitable for transmission by a network channel which does not meet a delay requirement for delay sensitive information, and a transmission means for dispatching the adapted voice mail message to a mobile station.

The connection used therefor could be a packet channel not guaranteeing the delay of transmission, a low speed channel too slow to transfer speech in real time or any other channel. In particular, in the case of a packet channel, segmentation of the voice mail message would be required as said adaptation.

Furthermore, the said object is achieved by a mobile station for a cellular network, comprising a receiving means for receiving an adapted voice mail message, a readapting means for readapting the received message into a reproducible format, and a reproduction means for reproducing the voice mail message.

In addition, the said object is achieved by a method for dispatching a voice mail message in a cellular network, comprising the steps of: receiving an incoming voice mail message at a voice mail server of said cellular network, adapting the received voice mail message into a format suitable for transmission by a network connection which does not meet a delay requirement for delay sensitive information, dispatching the adapted voice mail to a mobile station, receiving the dispatched voice mail message at the mobile station, and readapting the received voice mail message into a reproducible format.

With the above configurations, it is possible to deliver a voice mail message via a network connection which does not meet the delay requirement for delay sensitive information within a cellular network directly to a mobile station, so that the user can receive the voice mail message automatically and, thus, is no longer required to poll the voice mail server for messages by calling.

In particular, the adapting means preferably includes a packetising means for packetising the compressed voice mail message into data packets suitable for packet-switched transmission.

Advantageously, the voice mail message is adapted and transmitted conforming to GPRS and/or UMTS standards, so that it is possible to transmit a voice mail message even with low quality of service and at the same time use network resources effectively.

By preferably dispatching the voice mail message to an IP address and/or an ISDN address of said mobile station, the reception thereof is possible either if the user has activated the corresponding address or if he is GPRS attached and the network uses network requested context activation.

If the mobile station is unable to receive the message, the voice mail message is preferably redispatched in a predefined manner, for example repeatedly on a regular or configurable basis for a predetermined period of time, or may be queued into a store-and-forward service, whereafter the mobile station is informed of the stored message when it can be reached again.

Preferably, the stored message is then dispatched when the mobile station becomes reachable, or when the mobile station asks for messages or for a certain message.

In a further preferred embodiment of the present invention, the voice mail message is stored in a storage means of the mobile station adapted to store a plurality of voice mail messages.

Advantageously, if it is found that the storage means of the mobile station can not store all voice mail messages waiting at the voice mail server at one time or if it is found that a voice mail message exceeds a predefined size and, thus, can not be stored completely in said storage means at one time, another message is sent to the mobile station indicating that further voice mail messages or a remainder of said large voice mail message are still waiting to be dispatched.

In case of plural messages waiting at the voice mail server, a list of a plurality of stored messages can be dispatched to the mobile station.

In case that a voice mail message is not dispatchable within a predetermined period of time, another message indicating the same can be transmitted to the mobile station. In this case, the user could thereafter query the voice mail server, or have the voice mail server queried automatically by the mobile station.

Further preferably, the mobile station also includes an adapting means for adapting a voice mail message into a format suitable for transmission by a network channel which does not meet a delay requirement for delay sensitive information, and a transmission means for dispatching the adapted voice mail message.

In a further preferred embodiment, the reproduction means at the mobile station also includes a display means for displaying an image or video portion attached to the voice mail message.

Additional embodiments of the present invention are subject of further dependent claims.

BRIEF DESCRIPTION OF THE DRAWINGS

In the following, the invention will be described in greater detail by way of a preferred embodiment with reference to the accompanying drawings, in which.

BEST MODE FOR CARRYING OUT THE INVENTION

Figure 1:
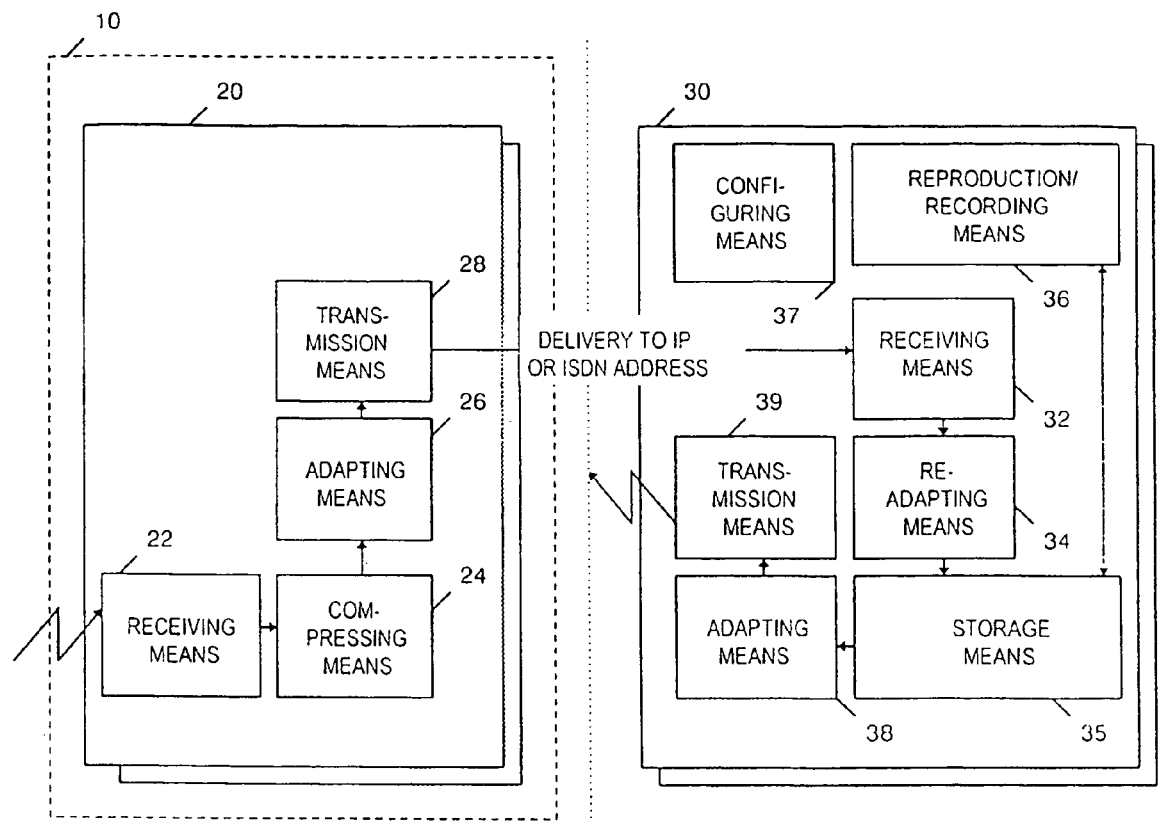
FIG. 1 schematically shows an arrangement and a principle for delivering a voice mail message according to an embodiment of the present invention including a voice mail server and a mobile station in a cellular network.
Figure 2:
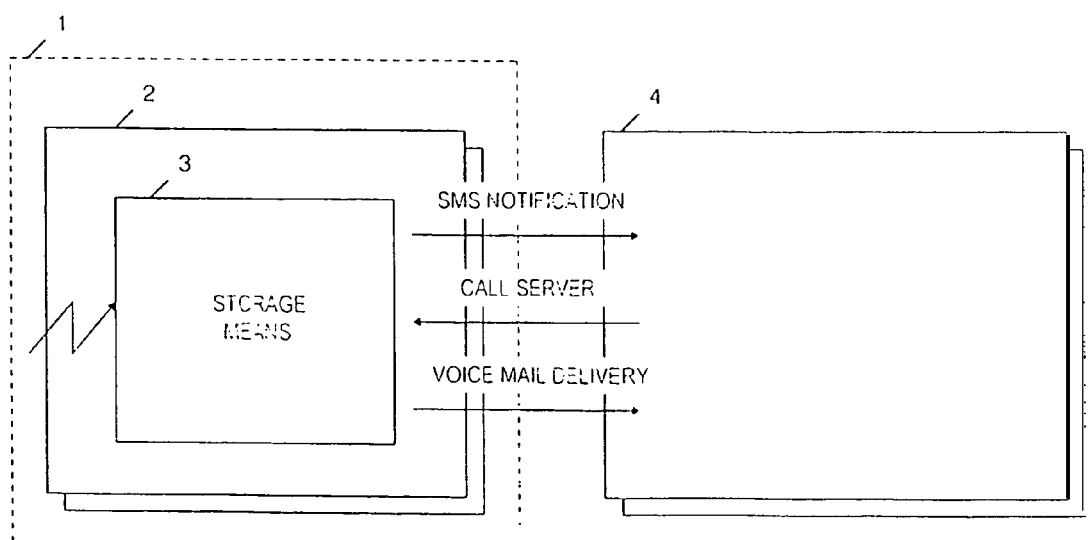
FIG. 2 schematically shows the principle of delivering a voice mail message in the prior art.

FIG. 1 schematically shows an arrangement and a principle for delivering a voice mail message according to an embodiment of the present invention including a voice mail server and a mobile station in a cellular network.

In FIG. 1, reference numeral 10 denotes a cellular network which may, for example, be a GSM cellular network including GPRS extensions, or a future UMTS network.

Reference numeral 20 denotes a voice mail server as a device forming part of the cellular network 10. A receiving means 22 is located at an input section of the voice mail server 20 for receiving an incoming voice mail message. The receiving means 22 delivers the received voice mail message to a compressing means 24 for compressing the message. It should be noted that the compression employed in the voice mail server 20 is not necessarily a GSM coded one, but may be based on any algorithm conforming to the network standards used and being suitable to compress the voice mail message to proper size. The compressing means 24 is followed by an adapting means 26 for adapting or segmenting, respectively, the compressed message into data portions corresponding to the requirements of the transmission channel used. In a practical arrangement, the adapting means 26 may include a packetising means for packetising (by segmentation) the compressed voice mail message into data packets suitable for packet-switched transmission. The packetising means may be located inside or outside the voice mail server 20. The compressing means 24 and the adapting means 26 may include analog circuitry, digital circuitry or a combination thereof. The adapting means 26 furnishes the generated adapted data to a transmission means 28 which outputs the adapted data to the outside of the voice mail server 20.

A dashed line in FIG. 1 indicates an interface to a public data network or a GSM air connection for exchanging information including the voice mail message dispatched by the voice mail server 20 with a mobile station 30 of a user.

The mobile station 30 includes a receiving means 32 for receiving the adapted voice mail message sent from the voice mail server 20, a readapting means 34 for readapting or reassembling the received voice mail message into a reproducible format, and a storage means 35 for storing the readapted voice mail message. The storage means 35 is preferably an erasable, rewritable memory having a capacity which is large enough to store one or more voice mail messages. A received compressed voice mail message can be stored in uncompressed or compressed format, in which cases a decompression is carried out at the time of writing the message into the memory or at the time of reading out the message therefrom, respectively. The storage means 35 is in a suitable manner also connected to user operable keys (not shown) and a reproduction/recording means 36, which comprises a display and/or a speaker, for processing, displaying and/or playing the received message at the mobile station 30.

Furthermore, the mobile station 30 also includes a configuring means 37 for setting a set of options available at the mobile station for data transmission control. These options substantially include a setting for the manner in which the user is alerted of a message, i.e. whether the user is required to poll the server, whether an alert is pushed to the mobile station 30 or whether the voice mail is pushed to the mobile station 30, a setting specifying what to transmit, including for example the maximum number of messages and the maximum transmission speed (KB), and a setting relating to the processing of a memory full condition. The voice mail server and/or the public data network server are correspondingly informed of the setting of these options upon attaching to the cellular network or activating the IP address or subscription. The configuring means 37 is of course not limited to the aforementioned options, but may include any options useful for controlling the reception and transmission of voice mail messages.

According to FIG. 1, an incoming voice mail message reaching the voice mail server 20 is received by the receiving means 22, compressed by the compressing means 24, adapted into segment data by the adapting means 26 and then delivered automatically and directly to the addressed mobile station 30 by sending it to the fixed IP address or an ISDN address thereof via a public data network or the GPRS.

If the user is reachable, an SMS or GPRS message or packet is sent to the mobile station 30 in order to alert the user of the received voice mail message. In case of plural messages, the sent alert may further include a list of messages from which the user can take preliminary information regarding, for example, the sender and the contents, or select one or a plurality of messages to be queried from the server prior to others.

When the user has activated the fixed IP address or is GPRS attached and the network uses network requested context activation, the voice mail message is automatically received at the mobile station 30 and, after readaptation, stored in the storage means 35. The user can then read out the message from the storage means 35 and listen to the same at any time.

In case that the mobile station 30 is unable to receive the message, for example because the user is out of range, the voice mail server 20 tries in a predefined manner, which may include repeated attempts on a regular or configurable basis for a predetermined period of time, for example during a week or any other arbitrary time period, to deliver the voice mail message to the mobile station 30, or send a short message via the SMS to indicate the delivery of a voice mail message. Alternatively, a store-and-forward service is implemented on top of the GPRS which then allows to queue an at present undeliverable message and to deliver the message to the mobile station 30 directly when the mobile station 30 becomes reachable again, for example when the mobile station 30 attaches and becomes standby, or when the mobile station 30 asks for messages or for a certain message. Such a store and forward mechanism could also employ an improved short message service allowing the transfer of a larger segment, which is sometimes also referred to as advanced SMS.

In particular, even if the storage means 35 of the mobile station 30 has a capacity which is large enough for storing a plurality of voice mail messages, there may be a case in which the number of messages waiting at the voice mail server 20 is too large to fit into the storage means 35 at one time, in which the number of messages configured at the mobile station 30 is smaller than the number of messages actually waiting, or in which a single message is larger than a predefined size (maximum buffer capacity of the mobile station 30). In this case, another message is transmitted to the mobile station indicating that further voice mail messages or a remainder of said larger voice mail message are still waiting to be dispatched. The latter handling is in particular also advantageous in cases in which an image or a video portion is attached to the voice mail message, which then can be dispatched and displayed stepwise corresponding to the capacity of the storage means 35 of the mobile station 30.

In a modification, the mobile station 30 is additionally capable of sending voice mail messages. Similar to the voice mail server 20, the mobile station 30 therefor further includes an adapting means 38 and a transmission means 39, which operate in a manner similar to those of the voice mail server 20 and provide for the sending of a voice mail message from the mobile station 30 via the aforementioned GSM air connection or public data network to an IP or ISDN address of another mobile station or network constituent.

In order to record a voice mail message at the mobile station 30, the reproduction/recording means 36 further includes a microphone. The recorded message is preferably stored in the storage means 35 before being processed for transmission. In this manner, it is possible to prepare a plurality of voice mail messages beforehand, i.e. off-line, and to dispatch them when the mobile station 30 becomes attached again, or to reply to a received voice mail message by combining the reply message and the received message as a reference.

The illustrated principles show remarkable benefits in cellular networks being capable of high capacity cellular transmission and are, thus, in particular also applicable to the future UMTS.

In view of the delay insensitive voice mail transmission, which result in that low delay transmission methods are up to now used in vain when the user is required to listen to a voice mail message stored at the voice mail server in real time, the above-described principles therefore also provide for a transmission method which uses available resources effectively at the cost of tolerably low delays. As such transmission method, packet data transmission, efficient compression and circuit switched transmission or efficient compression and packet switched transmission may for example be used.

In particular with high capacity cellular networks such as the GPRS or the UMTS, which offer a connection to standard data networks like TCP/IP, X.25 networks for mobile users using a packet switched connection, the most optimum resource utilization is obtained by using a dynamic sharing method between circuit switched and GPRS channels.

Routing is advantageously performed by a mobility router which provides for the connection to and interworking with various data networks, the mobility management with the GPRS system and the delivery of data packets to a mobile station independent of its location.

It is to be noted that voice mail messages as understood herein include any kind of messages which, when they are displayed, require a certain quality of service (low delay for voice), such as messages dispatched during e.g. browsing the Internet or the World Wide Web, respectively, or messages dispatched within road traffic information systems, train control systems, telemetrics and taxi booking and management systems. They may even include image or video portions attached to voice data at, for example, Internet terminals or company headquarters.

Thus, as has been described above, within a cellular network, an incoming voice mail message is received at a voice mail server, adapted into a format suitable for transmission by a network channel which does not meet a delay requirement for delay sensitive information, dispatched to a mobile station, and received, readapted and stored thereat within a storing means. Adaptation, transmission, reception and readaptation conform to standards such as the GPRS and the UMTS. The voice mail message is dispatched directly to the mobile station via an IP address or an ISDN address thereof.

In this manner, instead of dispatching a message via the SMS, the sending of an adapted voice mail message directly to a mobile station and storing it thereat makes it possible to avoid that a user has to poll a service center by calling in order to have the message delivered.

It should be understood that the above description and accompanying figures are only intended to illustrate the present invention. Thus, the structures according to the present invention may also be used within arrangements other than that referred to in the described example. The preferred embodiment of the invention may also vary within the scope of the attached claims.

What is claimed is:

1. Voice mail server, comprising a reception device configured to receive an incoming voice mail message;
   an adaption device configured to adapt the voice mail message into a format suitable for transmission by a network channel that does not meet a delay requirement for delay-sensitive information; and
   a transmission device configured to directly dispatch the adapted voice mail message to a mobile station after receiving the incoming voice mail message and adapting the voice mail message,
   wherein the adaption device includes a packetisation device configured to packetise the voice mail message into data packets suitable for packet-switched transmission,
   wherein the voice mail server comprises a single unit, and
   wherein the voice mail server is configured to redispatch the voice mail message in a predefined manner if the addressed mobile station is unable to receive the message, said predefined manner including the repeated redispatchment of the voice mail message on a regular or configurable basis for a predetermined period of time.

2. Voice mail server according to claim 1, wherein the voice mail server is configured to adapt and transmit the voice mail message conforming to GPRS or UNTS standards.

3. Voice mail server according to claim 1, wherein the voice mail server is configured to dispatch the voice mail message to an IP or ISDN address of said mobile station.

4. Voice mail server according to claim 1, wherein the voice mail server—is configured to queue the voice mail message into a store-and-forward service, if the addressed mobile station is unable to receive the message, and to inform the mobile station of the stored message when the mobile station—becomes reachable again.

5. Voice mail server according to claim 1, wherein the voice mail server—is configured to queue the voice mail message into a store-and-forward service, if the addressed mobile station—is unable to receive the message, and to dispatch the stored message to the mobile station—when the mobile station becomes reachable again.

6. Voice mail server according to claim 1, wherein the voice mail server—is configured to dispatch the stored message when the mobile station—asks for messages or for a certain message.

7. Voice mail server according to claim 1, wherein, if it is found that a memory of the mobile station is unable to store all voice mail messages waiting at the voice mail server—at one time, or if it is found that the voice mail message exceeds a predefined size, the voice mail server—is configured to dispatch another message to the mobile station— indicating that further voice mail messages or a remainder of said large voice mail message are still waiting to be dispatched.

8. Voice mail server according to claim 7, wherein the voice mail server—is configured to dispatch a list of a plurality of stored messages to the mobile station.

9. Voice mail server according to claim 1, wherein the voice mail server—is configured to transmit a special message to the mobile station—if a voice mail message is not dispatchable within a predetermined period of time.

10. Voice mail server, comprising:
    a receiving means for receiving an incoming voice mail message;
    an adapting means for adapting the voice mail message into a format suitable for transmission by a network channel that does not meet a delay requirement for delay-sensitive information; and
    a transmission means for directly dispatching the adapted voice mail message to a mobile station after receiving the incoming voice mail message and adapting the voice mail message,
    wherein the adapting means includes a packetising means for packetising the voice mail message into data packets suitable for packet-switched transmission, and wherein the voice mail server comprises a single unit,
    wherein the voice mail server is configured to redispatch the voice mail message in a predefined manner if the addressed mobile station is unable to receive the message, said predefined manner including the repeated redispatchment of the voice mail message on a regular or configurable basis for a predetermined period of time.

11. A method, comprising receiving an incoming voice mail message;
    adapting the voice mail message into a format suitable for transmission by a network channel that does not meet a delay requirement for delay-sensitive information; and
    directly dispatching the adapted voice mail message to a mobile station after receiving the incoming voice mail message and adapting the voice mail message,
    wherein the adapting includes packetising the voice mail message into data packets suitable for packet-switched transmission, and wherein the voice mail server comprises a single unit,
    further comprising redispatching the voice mail message in a predefined manner if the addressed mobile station is unable to receive the message, said predefined manner including the repeated redispatchment of the voice mail message on a regular or configurable basis for a predetermined period of time.

* * * * *